July 11, 1933.  W. L. SCHELLENBACH  1,917,905
MACHINE TOOL FEEDING APPARATUS
Filed Oct. 10, 1930          7 Sheets-Sheet 2

Inventor
William L. Schellenbach,
By C. W. Miles.
Attorney

Patented July 11, 1933

1,917,905

UNITED STATES PATENT OFFICE

WILLIAM L. SCHELLENBACH, OF WYOMING, OHIO

MACHINE TOOL FEEDING APPARATUS

Application filed October 10, 1930. Serial No. 487,769.

My invention relates to improvements in machine tool driving and speed changing mechanism. One of its objects is to provide improved tool driving and speed changing apparatus for lathes and other similar machine tools. Another object is to provide improved machine tool driving and speed changing mechanism in which practically all the changes and adjustments are adapted to be made without leaving a position in front of the tool carriage apron. Another object is to provide improved tool feeding and thread chasing apparatus. Another object is to provide improved speed changing apparatus carried by the tool carriage controlling the tool feed and the thread chasing speed ratios. Another object is to provide an improved speed changing apparatus carried by the tool carriage controlling the tool feed and thread chasing ratios, combined with positive reversing mechanism. Another object is to provide improved and combined speed changing and starting and stopping means all controllable from the tool carriage. Another object is to provide a shiftable index plate carried by the tool carriage and operatively connected with the change gear mechanism adapted to alternately indicate tool feeding ratios and thread chasing ratios, depending upon whether the driving mechanism is set to feed the tool or to chase threads. Another object is to provide in combination with speed changing live spindle driving mechanism, speed changing tool carriage driving mechanism, and spindle speed changing and spindle starting and stopping means operable from the tool carriage. My invention also comprises certain details of form and arrangement and combination of components, all of which will be fully set forth in the description of the accompanying drawings, in which:

It is desirable to be able to make all the shifts required to change the speed of the live spindle, to change the speeds of the tool feed, to change the speeds for thread chasing, and to make the various starting and stopping shifts of the live spindle, the tool feed, and the thread chasing from a single position of the operator in front of the tool carriage, particularly in machine tools employed in the production of duplicate articles and duplicate parts, where frequent changes of various kinds are required, and quantity production is desired. My improved apparatus is adapted to attain these and other important advantages.

The accompanying drawings illustrate one embodiment of my invention, in which 15 represents a lathe bed, 16 lathe ways, 18 a headstock housing in which are journaled a live spindle, and a plurality of shafts and speed change gears and speed change shifting members adapted to drive said live spindle at relatively different rates of speed. A rock shaft 20 is journaled in the headstock housing 18, and is adapted to be rocked manually by means of a hand lever 21 to shift one of said speed change shifting members within the housing 18 to control the speed of the live spindle 19. A crank arm 22 attached to the rock shaft 20 is connected by a link 23 with the projecting end of a hydraulically operable piston 23' located within a cylinder block 24, whereby the rock shaft 20 is adapted to be hydraulically operated by the operator when positioned in front of the tool carriage. A rock shaft 25 is journaled in the headstock housing 18 and is manually operable by means of a hand lever 26. A crank arm 27 is also attached to the rock shaft 25, and operatively connected by a link 28 with the projecting end of a piston rod 29 connected to a hydraulically operable piston mounted in a cylinder block 24. The rock shaft 25 is operatively connected within the headstock housing 18 with one of the live spindle speed changing members. A rock shaft 30 is journaled in the headstock housing 18, and manually operable by means of a hand lever 31. A crank arm 32 is also attached to the rock shaft 30, and is operatively connected by a link 33 with the projecting end of a piston rod 34 attached to a hydraulically operable piston mounted in the cylinder block 24. A valve chamber 35 is provided with a rotatably operable valve connected to and rotatable by a shaft 36 journaled to the front of the lathe bed and adapted to be rocked or rotated by an operator positioned in front of the tool carriage. The rotatable valve is provided with a series of ports to admit fluid under pressure selectively either above or below the pistons in the cylinder block 24 in different selected combinations to hydraulically actuate the respective live spindle speed changing shifting members to secure any desired live spindle speed. A rock shaft 37 is journaled in the headstock housing, and is manually operable by means of a hand lever 38'. The rock shaft 37 carries three crank arms 38, 39 and 48. The crank arm 38 is operatively connected to a fluid control valve 40 adapted to admit or cut off the supply of fluid under pressure through a conduit 40' to the valve located in the valve chamber 35. The crank arm 39 is connected by a link 41 to a crank arm 42 attached to a rock shaft 43, on which is mounted a beveled gear 44 located in a housing 45. The beveled gear 45 is in mesh with a beveled gear 46 mounted upon a shaft 47 journaled to the front of the lathe bed. The middle portion of the shaft 47 is of polygonal cross section, or if desired may be a splined shaft instead. The operator by rocking the shaft 47 from a position in front of the tool carriage is enabled to rock the shaft 37 and thereby actuate the valve 40, and at the same time through a crank arm 48 located within the headstock housing to shift a clutch to clutch a prime driving member 49 located in a housing 50 at the rear of the headstock in driving relation with the prime live spindle driving shaft journaled in the headstock housing. A tailstock of usual type 51 is mounted upon the lathe bed.

Figures 1, 12:
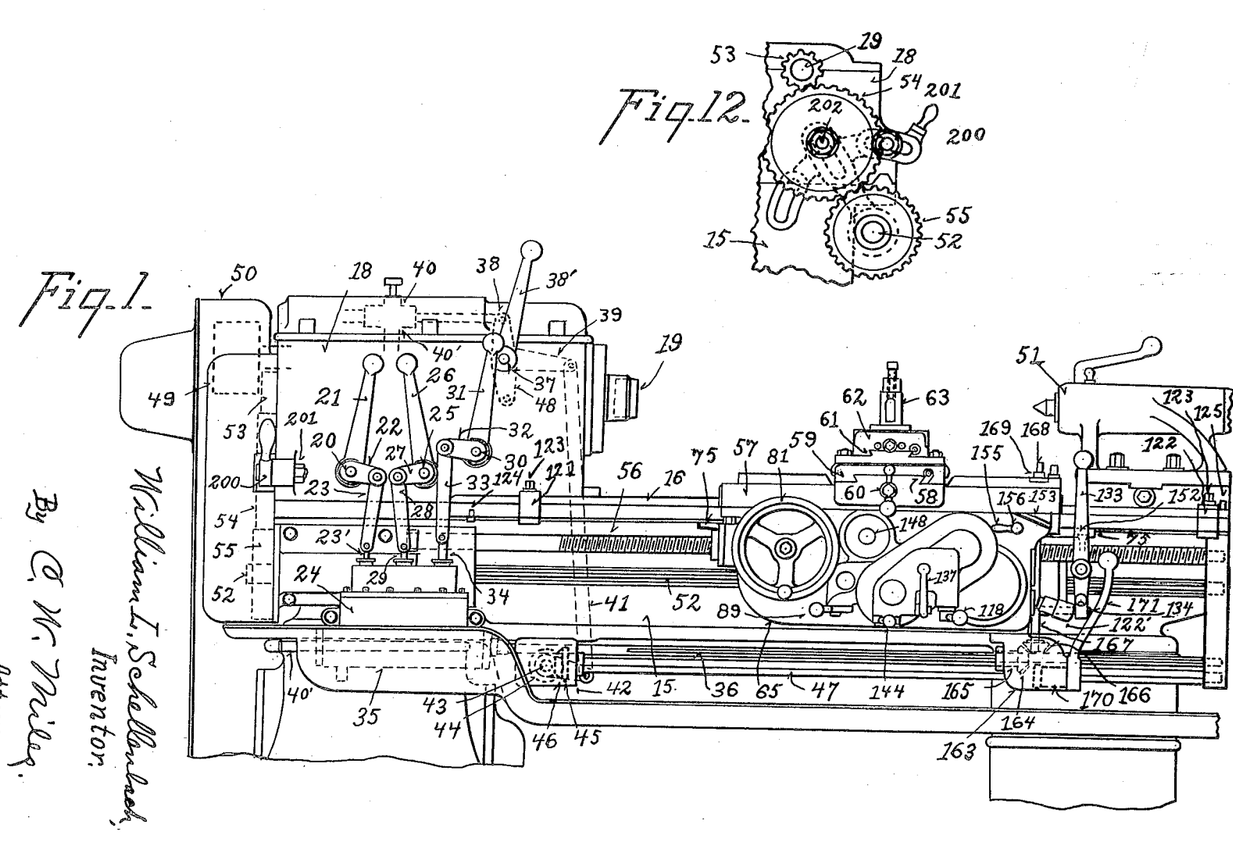
Fig. 1 is a front elevation of a lathe embodying my improvements.
Fig. 12 is a detail of a portion of the tool carriage feeding gear train.

A splined shaft 52 is driven from the live spindle through a train of gears 53, 54, 55 mounted upon a slotted plate or quadrant 200 see Fig. 12, adjustable angularly about shaft 52 as a center of adjustment, and held in its adjusted positions by means of a clamping bolt 201. The quadrant 200 is slotted to receive a stud shaft 202, which carried an intermediate gear 54. The quadrant 200 is provided at this point in order that gears of relatively different diameter may be used interchangeably at 55 to give variable speed to the shaft 52. A change of speed at 55 is translatable at the tool carriage into a variety of speed changes at the tool. The shaft 52 is journaled to the front of the lathe bed. A screw threaded shaft 56 is mounted rigidly upon the front of the lathe bed adjacent to the shaft 52. The shaft 56 has two separate treads chased thereon. A main tool carriage 57 is mounted upon and adjustable longitudinally of the lathe bed upon the lathe ways. The main tool carriage is provided with ways 58 transversely thereof, upon which is mounted a cross feed tool carriage 59, adjustable transversely of the lathe bed by hand or by power feed by means of a cross feed screw 60. The cross feed carriage 59 is provided with ways 61 transversely of the lathe bed, upon which is mounted a tool post carriage 62, provided with a tool post 63.

Figure 2:
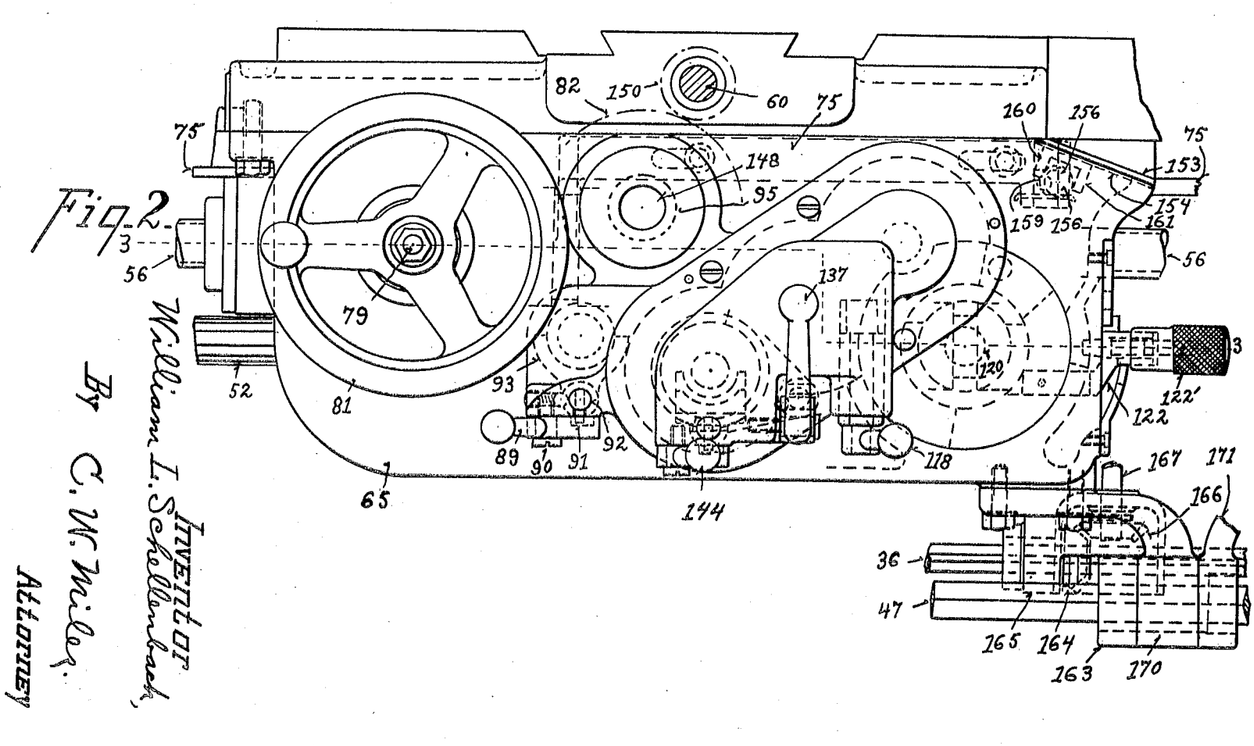
Fig. 2 is an enlarged front elevation of the tool carriage and tool carriage apron of Fig. 1.

A sleeve 64 (see Fig. 3) is journaled to the apron 65 of the main tool carriage, and its bore fits the exterior of the threaded shaft 56, so that as the tool carriage moves along the lathe ways, the sleeve 64 slides endwise along the screw shaft 56 and is free to revolve. The sleeve 64 has recesses 66 and 67 to receive threaded nut segments or sections 68 and 69, which serve in pairs as jaws. One pair of oppositely located jaws 68 engage one of the threads on shaft 56, and the opposite pair of opposed jaws 69 engaging with the other thread on shaft 56. To facilitate understanding of the relation of the jaws 68 and 69 with the threads of shaft 56, the jaws 68 and 69 and the sleeves 64 and 70 are illustrated diagrammatically in Fig. 3 as though taken upon line 3a—3a of Fig. 11, to thereby show the relative positions of one jaw 68 and one jaw 69. The pairs of jaws 68 are held in place in the recesses 66 and 67 by means of a sleeve 70, which is adjustable endwise of the sleeve 64 to thereby force one pair of jaws, for instance jaws 68 radially inwardly to engage one thread on shaft 56, while the opposite pair of jaws 69 is in its outer position, out of driving relation, but not entirely out of engagement with the other thread of shaft 56. The exterior of the jaws 68 and 69 are provided with ribs 71 and depressions 72, and the interior of the sleeve 70 is provided with ribs 73 and depressions 74, so spaced as to cause the ribs 73 of the sleeve when opposite the ribs 71 of the jaws to force the jaws inwardly, and when the depressions 74 of the sleeve 70 are opposite the ribs 71 of the jaws to allow the jaws to move out of engagement with the threads of the shaft 56. The forked end of a member 75' attached to a sliding bar 75 is (Fig. 2) carried by and adjustable relative to the lathe apron, and enables the sleeve 70 to be adjusted endwise of the sleeve 64 to engage and disengage the nuts or jaws 68 and 69 in pairs with the threaded shaft 56. The sleeve 64 is preferably journaled to the lathe apron by means of Timken bearings 76. A beveled gear 77 is keyed to the sleeve 64, and is in mesh with a beveled gear 78 integral with a shaft 79 journaled in bearings in the lathe apron. The shaft 79 is provided with a gear 80 by means of which the shaft may be power driven, and outside of the apron, shaft 79 is provided with a hand wheel 81 by means of which the shaft 79 may be manually rotated to thereby rotate the sleeve 64 and jaws 68 and 69 to drive the main tool carriage along the lathe ways either to feed the tool through one of the threads on shaft 56, or to chase threads upon the work, using the other thread upon the shaft 56, and thereby relieving one of said threads on shaft 56 from the strain and wear incident to feeding the tool, and keeping it true and accurate for use in thread chasing operations. The respective pairs of jaws 68 and 69 when in their retracted positions are not entirely retracted from engagement with the respective threads of the shaft 52, but are only retracted a sufficient amount to be out of driving relation with said threads, and out of contact with the face of said threads, but not free to assume new relations with the threads of said shaft 52.

Figure 4:
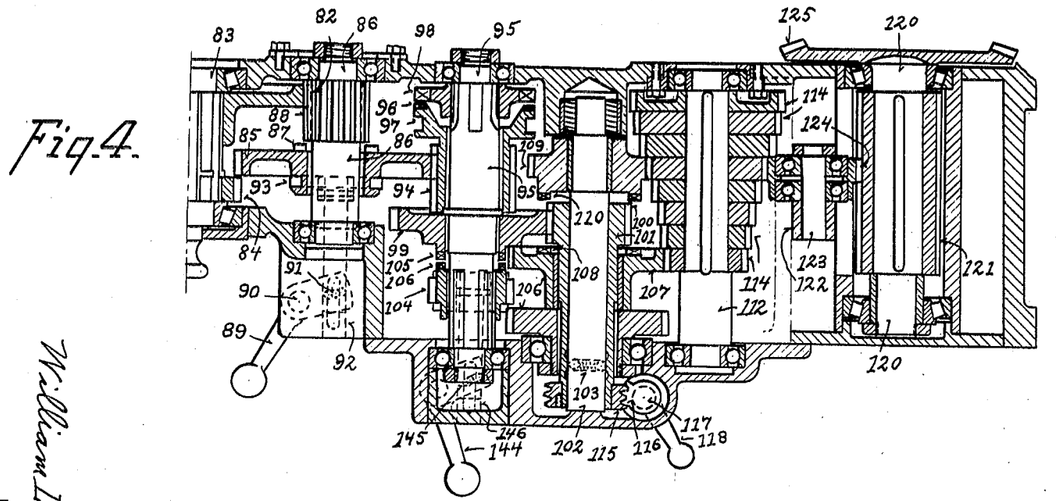
Fig. 4 is a diagrammatic section through the tool carriage apron, illustrating in one horizontal plane a portion of the tool carriage driving and speed changing mechanism.

The gear 80 is in position to mesh with and be driven by a gear 82 (Fig. 4) mounted upon a shaft 83, journaled in the apron and also provided with another gear 84. A gear 85 is loosely mounted upon a shaft 86 journaled to the apron. The gear 85 is adjustable axially thereof to a position out of engagement with the gear 84, and to another position in mesh with the gear 84. Gear 85 is also provided with clutch members 87 adapted to clutch said gear 85 to the teeth of a pinion 88 carried rigidly on the shaft 86. The gear 82 on shaft 83 meshes with the pinion 88 on shaft 86. The gear 85 is adapted to be shifted endwise upon the shaft 86 by means of a hand lever 89 pivotally attached to the tool carriage apron at 90 and provided with a pin 91 engaging a shaft or push rod 92 movable endwise in bearings in the apron. A forked arm 93 attached to the inner end of the push rod 92 engages an annular recess in the hub of gear 85 to shift said gear to different positions endwise of shaft 86. A latch member 92' locks the push rod 92 to its two different positions. The gear 85 is continuously in mesh with an elongated pinion 94 which is loose on a shaft 95, journaled in bearings in the tool carriage apron. One end of the pinion 94 is provided with clutch members 96, and an annular shifting recess 97, whereby the pinion 94 may be clutched in driving relation to the shaft 95 or disconnected therefrom, by engaging or disengaging the clutch teeth 96 with the clutch members 98 mounted rigidly upon the shaft 95. A gear 99 is mounted loosely upon the shaft 95, and is continuously in mesh with a gear 100 mounted upon a sleeve 101, which is loosely journaled upon a shaft 102 and adjustable endwise thereon, being held to its two different positions of adjustment upon the shaft 102 by means of a spring actuated latch member 103. A gear 104 is splined to and adjustable endwise upon the shaft 95. The gear 99 is provided with clutch members 105 adapted to be engaged by clutch members 106 carried by the gear 104, to clutch said gears together in driving relation. The gear 104 has a neutral position, out of engagement with the gear 99 and also out of mesh with gear 107 and also an active position in mesh with gear 106' splined upon the sleeve 101 of shaft 102. A gear 107 is journaled loosely upon the sleeve 101 intermediate of the gears 100 and 106'. The gear 107 is provided with clutch teeth 108 adapted to engage the teeth of gear 100 to clutch the gear 107 in driving relation with the sleeve 101. A gear 109 is journaled loosely upon the shaft 102 at the opposite end of gear 100. Gear 109 is provided with clutch teeth 110 adapted to engage the teeth of gear 100 to clutch the gear 109 in driving relation to the sleeve 101.

Adjacent to the shaft 102 is a shaft 112 journaled in bearings in the apron 65. The shaft 112 has splined thereto a cone of gears 114, comprising a series of approximately eight gears of relatively different numbers of teeth. The gear 107 meshes with one of these cone gears, and the gear 109 meshes with another of said cone gears. An annular rack 115 is attached to one end of the sleeve 101, and said annular rack is engaged by a segmental gear 116 mounted upon a rock shaft 117, adapted to be shifted by means of a hand lever 118 from an intermediate idle position shown in full line in Figs. 3 and 4, to an active position at one side shown in dotted line, with the gear 107 clutched to the gear 100, or to an active position indicated in dotted line at the opposite side with the gear 109 clutched to the sleeve gear 101, the sleeve 101 being latched to the shaft 102 in either one of its two active positions by the latch member 103.

A shaft 120 is journaled to the apron 65, and is provided with an elongated gear 121 keyed thereto opposite the cone of gears 114. A setting lever 122 is provided with a latch member 122' to latch it to different positions relative to the cone of gears 114, and with reference to the apron 65, and also provided with a shaft 123 journaled in forked arms of said setting lever 122. The shaft 123 has journaled thereon a gear 124 which is continually in mesh with the gear 121, and is adapted to be adjusted in a planetary direction about the gear 121, and also longitudinally of the gear 121, to thereby enable the gear 124 to be selectively meshed with any one of the gears of the cone gear 114 to drive the shaft 112 and the train of gears receiving motion therefrom at a relatively wide range of different speeds. A beveled gear 125 on the shaft 120 is driven from the splined shaft 52 selectively in either forward or reverse direction through either one or other of the beveled gears 126 and 127 loose on the shaft 52 and journaled to the apron 65 so as to slide along the shaft 52 as the main tool carriage moves along the lathe ways. A sleeve 128 splined to the shaft 52, and located intermediate of the gears 126 and 127 is provided at one end with a single tooth clutch member 129 to engage a clutch member 130 carried by the gear 126 to clutch the gear 126 in driving relation to the sleeve 128 and shaft 52. The sleeve 128 is provided at its opposite end with a single tooth clutch member 131 adapted to engage a clutch member 132 carried by the gear 127 to clutch the gear 127 in driving relation with the sleeve 128 and the shaft 52. A shifting lever 133 is adapted to be manually operated to actuate a push rod 134, see Figs. 1, 3, 6 and 7 which in turn shifts a forked arm 135, which engages an annular recess 136 in the sleeve 128 to shift said sleeve endwise relative to the apron 65 and the gears 126 and 127 to clutch the shaft 121 in either forward or reverse driving relation with the shaft 52.

Figures 3, 11:
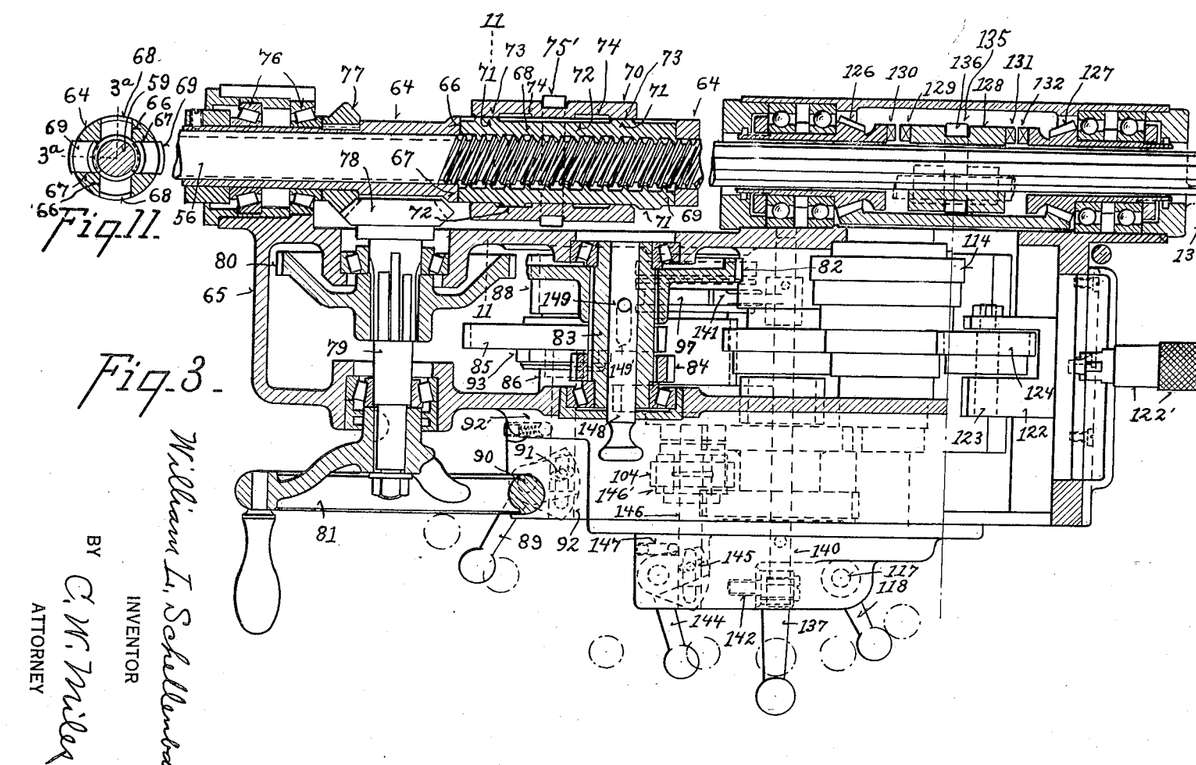
Fig. 3 is a horizontal section through the apron of the tool carriage, taken on line 3—3 of Fig. 2, illustrating the tool carriage driving and speed changing mechanism.
Fig. 11 is a sectional detail of the feed screw and nuts engaging said screw, taken on line 11—11 of Fig. 3.
Figures 5, 6, 7, 8:
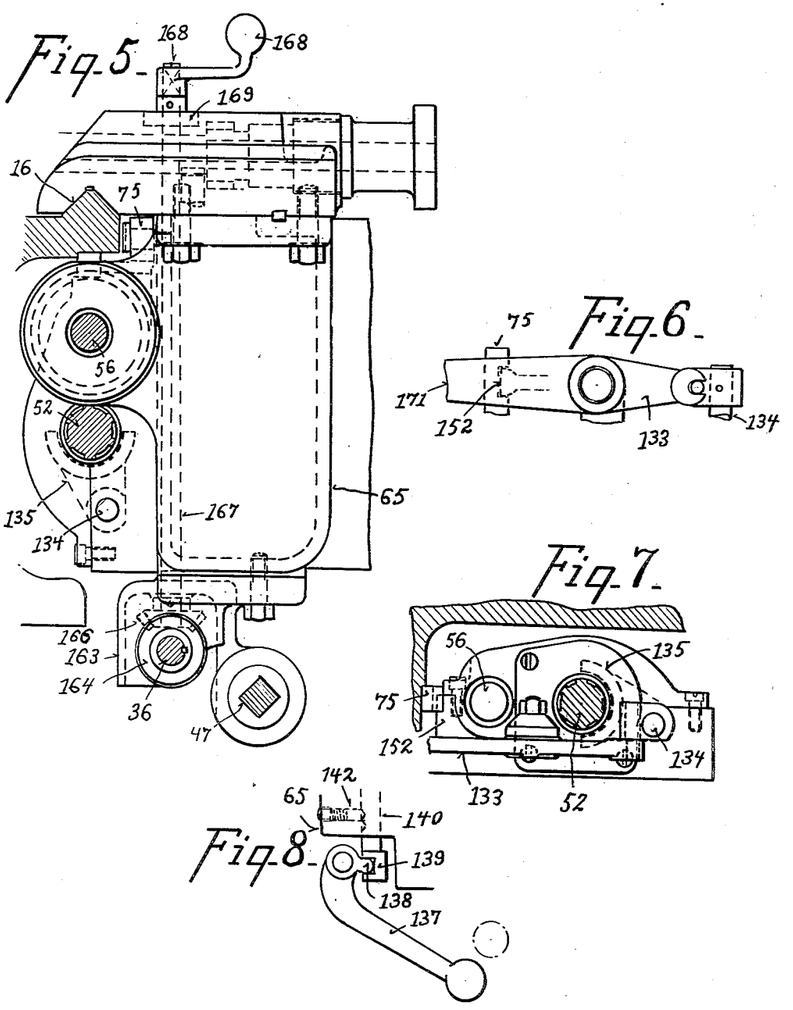
Fig. 5 is a vertical left end elevation of the tool carriage and apron.
Fig. 6 is a detail of the apron, clutch, shifting lever for reversing the feeds, detached.
Fig. 7 is a side elevation showing in detail a portion of the apron and clutch shifting lever of Fig. 6.
Fig. 8 is a sectional detail of the apron shifting lever for starting and stopping the feed.

A manually operable shifting lever 137, see Figs. 3 and 8, is pivotally mounted upon the front of the apron, and is provided with an arm 138 engaging a recess 139 in the end of a push rod 140 which is mounted to move endwise in bearings in the apron. At its inner end the push rod 140 is provided with a forked arm 141 which engages an annular recess 97 of the gear 94 to shift said gear 94 endwise on its shaft 95. A spring actuated latch member 142 holds the push rod 140 to either one of its two positions of adjustment. The lever 137 is used for stopping and starting the feed, as it controls the power line which is through but a single gear 94, which in turn meshes with gear 85 on the shaft 86. A manually operable shifting lever 144 is pivotally mounted upon the front of the apron, and is attached by a crank pin 145 with a push rod 146, mounted to move endwise relative to the apron. At the inner end of the push rod 146 is a forked arm 146' which engages upon opposite sides of the gear 104, and is adapted to shift said gear 104 endwise on its shaft 95 from an intermediate idle position to a position with the clutch members 106 in engagement with the clutch members 105, or to a position with the gear 104 in mesh with the gear 106'. A spring actuated latch member 147 serves to latch the gear 104 and its push rod 146' to its three respective positions of adjustment. A push rod 148 is adjustable endwise within the bore of the shaft 83, and is provided with a pin 149 passing through the hub of gear 82 and having limited movement endwise of shaft 83 in a slot 149'. The push rod 148 serves to selectively engage gear 82 with gear 80 on shaft 79, or with gear 150 mounted on the cross-feed screw 60 to enable the cross feed carriage 59 to be power driven when required. The shifting lever 133 has an interlocking connection 152, see Figs. 6 and 7 with the sliding bar 75 to cause the position of the sliding bar and the clutch members 129, 130, 131, and 132 to restrict or limit the range of movement of the lever 133.

Figure 9:
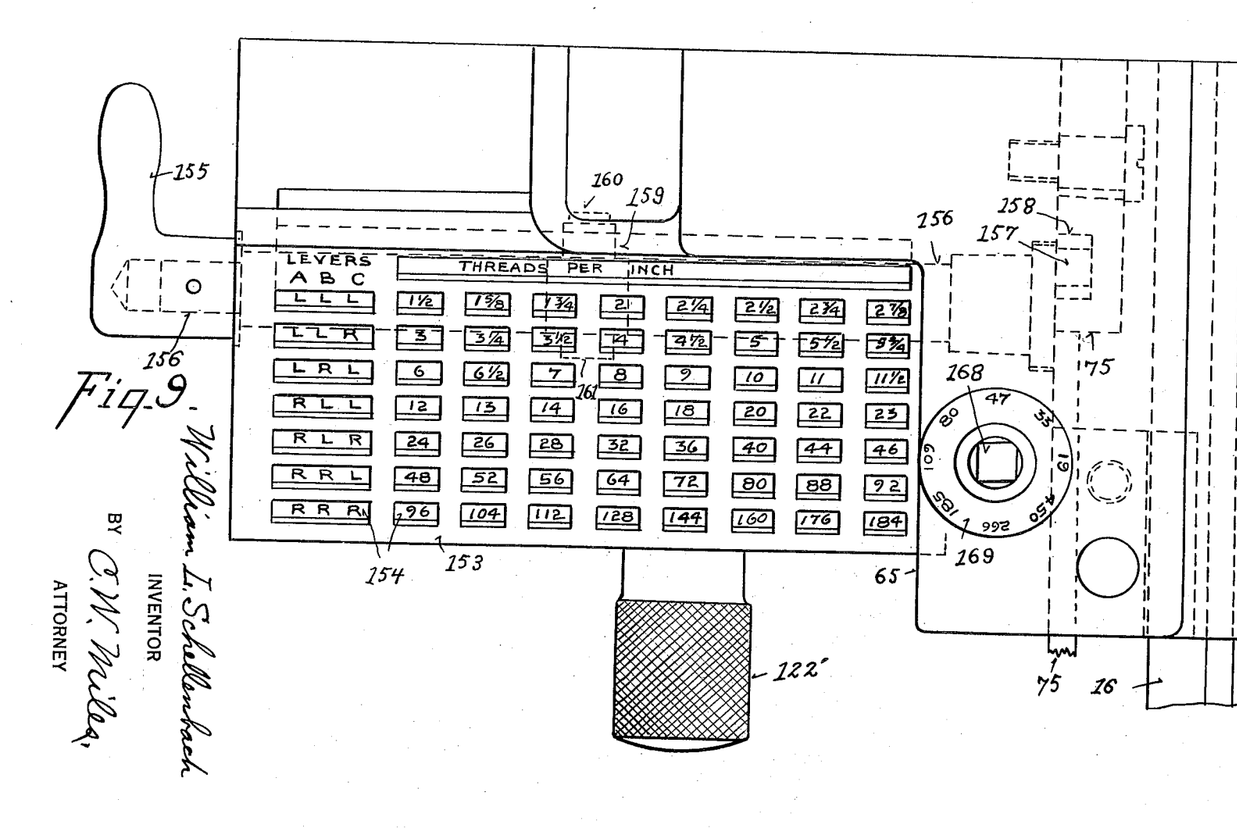
Fig. 9 is an enlarged plan of the tool carriage index plate showing the live spindle speed and the thread chasing combinations.
Figure 10:
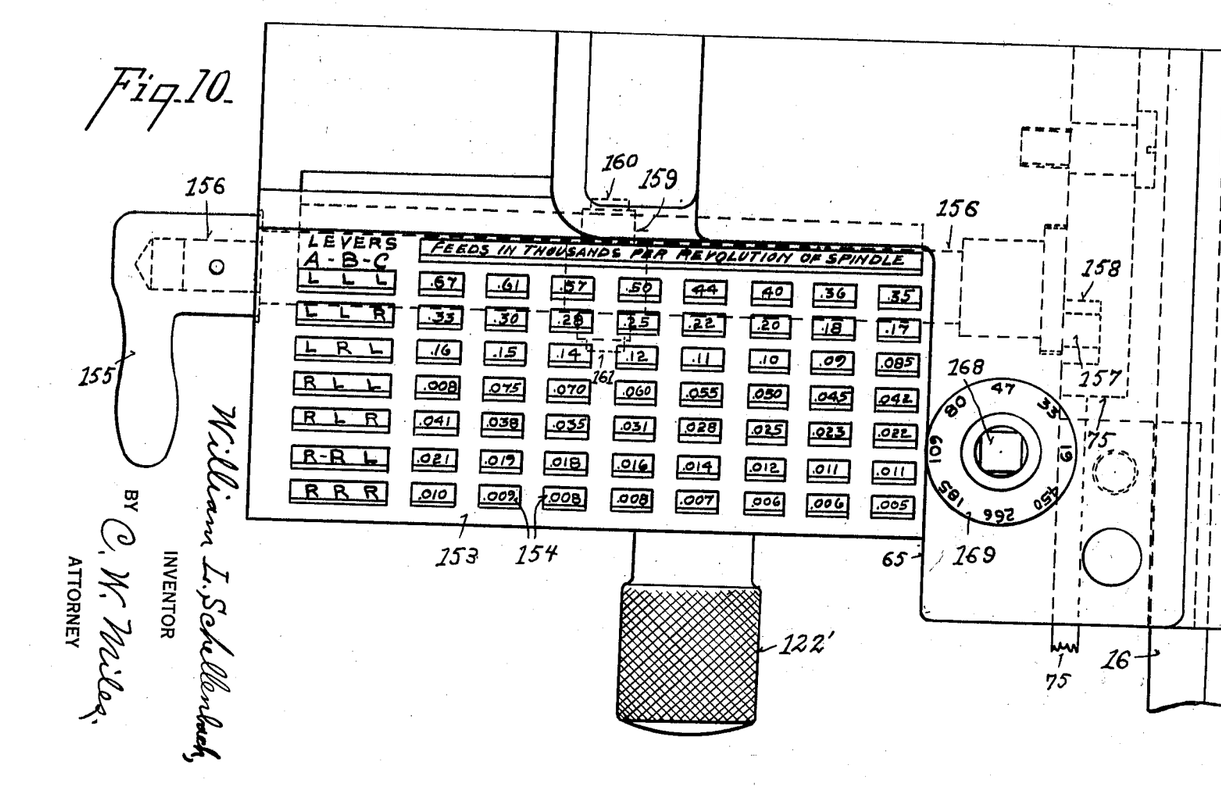
Fig. 10 is a view similar to Fig. 9, showing the index plate adjusted to indicate the live spindle speed setting and the tool feeding combinations.

Mounted upon the top of the main tool carriage is a grid shaped frame 153, and beneath said frame is an index plate 154, which carries two separate index tables, one shown in Fig. 10, to indicate the position of the various shifting levers and driving members to secure the various speeds for feeding the tool, and the other shown in Fig. 9 to indicate the respective positions of the various shifting levers and driving members to chase threads of various pitches. This index plate is adjustable beneath the grid frame 153 to show one index table through the grid at one extremity of the movement of the index plate 154, and to expose the other index table through the grid frame at the opposite extremity of the movement of the index plate 154. A manually operable lever 155 is attached to one end of a rock shaft 156, journaled to the main tool carriage, and adapted to rock said shaft through one hundred and eighty degrees. At its inner end the shaft 156 is provided with a crank pin 157 on which is mounted an antifriction roller 158 seated in a transverse slot in the slide bar 75, whereby the lever 155 may be employed to selectively engage the jaws 68 or the jaw 69 with the threaded shaft 56 by shifting the sleeve 70 endwise. The shaft 156 is provided with an eccentric 159 intermediate of its ends, which is engaged between projections 160 and 161 on the under face of the index plate 154 to shift said index plate relative to its grid frame 153 sufficiently to alternately display the respective index tables, depending upon the position of the sleeve 70 and the jaws 68 and 69.

Mounted upon the lower edge of the tool carriage apron is a housing 163, in which is mounted a beveled gear 164, the tubular hub 165 of which is journaled to the housing 163 and splined to the shaft 36, which serves to rotatably adjust the valve in the fluid pressure valve chamber 35. The gear 164 and hub 165 slide along the shaft 36 as the tool carriage moves along the lathe bed. A beveled gear 166 journaled in the housing 163 meshes with the gear 164. The shaft 167 to which the gear 166 is attached extends upwardly to the top of the tool carriage, where it is provided with a polygonal wrench seat 168 engaged by a detachable hand wrench 168', and an index plate 169, by means of which using wrench 168' the shafts 166 and 36 and the valve in the valve chamber 35 may be adjusted to any predetermined position and such position of the valve indicated upon the index plate 169. A sleeve 170 is journaled in the housing 163 with the shaft 47 passing through the polygonal bore thereof, and said sleeve adapted to slide endwise of the shaft 47 as the tool carriage moves along the lathe bed. A hand lever 171 is attached to the sleeve 170 and is operable to rock the shaft 47 to thereby rock the shaft 37 to admit fluid under pressure to the valve chamber 35, and also to shift the crank arm 48 to shift a clutch and brake mechanism within the headstock housing 18 to thereby start and stop the prime driving shaft of the train of shafts and gear mechanism employed to drive the live spindle 19. It will be noted that by resetting the position of the shafts 166 and 36 while the tool is in the act of carrying out one operation, the valve in the valve chamber is adjusted to a new position, but no change in the speed of the live spindle 19, or in the shifting mechanism controlling movements within the headstock occurs until after the hand lever 171 has been actuated to stop the rotation of the spindle 19 and the feed of the tool carriage, whereupon during the interval of rest of the live spindle 19, the fluid pressure acts upon the selected pistons in the cylinder block 24, to secure an automatic combined action of the speed changing mechanism within the headstock housing, whereby upon again shifting the starting lever 171, the speed changes will have been effected, and the live spindle will commence to rotate at the newly selected rate of speed.

Mounted upon the lathe ways 16, see Fig. 1 are tool carriage stop members 221 and 222, adjustable along the ways 16 within prescribed limits, and adapted to be clamped rigidly to the lathe ways by means of clamping screws 223. Permanent stop members 224 and 225 are mounted rigidly upon the ways 16 to limit the extent of the range of adjustment of the stop members 221 and 222. The slide bar 75 is mounted relative to the tool carriage to have a limited sliding movement, and opposite ends of said bar project sufficiently beyond the limits of the tool carriage to be in position to first engage the respective stop members 221 and 222 at opposite limits of the prescribed feed of the tool carriage, to thereby shift the bar 75 relative to the tool carriage and thereby by shifting the sleeve 128 and the clutch members 129 and 131 endwise of the shaft 52, to disengage the sleeve 128 from driving engagement with the gear 126, or from driving engagement with the gear 127, and thereby stop the tool carriage feed. The permanent stop members 224 and 225 prevent the adjustable stop members 221 and 222 being inadvertently set too far away from the tool carriage to serve in stopping the tool carriage feed before the tool carriage contacts with the headstock or with the tail stock to thereby cause injury to the lathe, or tool.

The apparatus herein illustrated and described is capable of considerable modification within the scope of the claims, without departing from the spirit of my invention.

What I claim is:

1. A machine tool comprising a bed, a work spindle carried thereby, a tool holder movable along said bed, a threaded shaft mounted stationarily along said bed, a tool holder driving shaft mounted rotatably along said bed, members carried by said tool holder positioned radially about said threaded member and adapted to selectively engage said threaded shaft to feed said tool holder along said bed, a train of driving members carried by said tool holder adapted to transmit motion from said tool holder driving shaft to said threaded shaft engaging members to propel said tool holder along said bed, means to indicate which of said members is in driving relation with said threaded member, and a shiftable member included in said train of driving members adapted to engage and disengage said tool holder driving shaft in driving relation with said threaded shaft.

2. A machine tool comprising a bed, a work spindle carried thereby, a tool holder movable along said bed, a threaded shaft mounted stationarily along said bed, a tool holder driving shaft mounted rotatably along said bed, members carried by said tool holder positioned radially about said threaded member and adapted to selectively engage said threaded shaft to feed said tool holder along said bed, a train of driving members carried by said tool holder operable to transmit motion from said tool holder driving shaft to said threaded shaft, manually operable means adapted to transmit motion to said threaded shaft engaging members, and a shiftable member operable to selectively connect said manually operable member or said tool holder driving shaft in driving relation with said threaded shaft engaging member, and means to indicate which of said members is in driving relation with said threaded member.

3. A machine tool comprising a bed, a work spindle carried thereby, a tool holder movable along said bed, a threaded shaft mounted stationarily along said bed, members carried by said tool holder positioned radially about said threaded member and adapted to selectively engage said threaded shaft to feed said tool holder along said bed, a manually operable tool holder feeding member mounted upon said tool holder, and a train of driving members carried by said tool holder and operatively connecting said threaded shaft engaging members with said manually operable member, and means to indicate which of said members is in driving relation with said threaded member.

4. A machine tool comprising a bed, a work spindle carried thereby, a tool holder movable along said bed, a threaded shaft mounted stationarily along said bed, and provided with a plurality of threads, a plurality of thread engaging members arranged at right angles to each other, each continuously in mesh with a thread upon said theaded shaft, means about said thread engaging members operable to shift said thread engaging members selectively into driving relation with said threaded shaft, and means to drive said thread engaging members to feed said tool holder along said bed, and means to indicate which of said members is in driving relation with said threaded member.

5. A machine tool comprising a bed, a work spindle carried thereby, a tool holder movable along said bed, a threaded shaft mounted stationarily along said bed, and provided with a plurality of threads, a plurality of thread engaging members arranged at right angles to each other in juxtaposition each continuously in mesh with a thread upon said threaded shaft and each shiftable into and out of driving relation with said threaded shaft, a tool holder driving shaft rotatably mounted along said bed, a train of driving members carried by said tool holder operable to transmit motion from said tool holder driving shaft to said threaded shaft, means operable to shift said thread engaging members selectively into driving relation with said threaded shaft, and a shiftable member included in said train of driving members operable to engage and disengage said tool holder driving shaft in driving relation with said threaded shaft, and means to indicate which of said members is in driving relation with said threaded member.

6. A machine tool comprising a bed, a work spindle carried thereby, a tool holder movable along said bed, a threaded shaft mounted stationarily along said bed, and provided with a plurality of thread, a plurality of thread engaging members each continuously in mesh with a thread upon said threaded shaft, means to drive said thread engaging members to feed said tool holder along said bed, means operable to shift said thread engaging members selectively into driving relation with said threaded shaft, an adjustable index member adapted to indicate which of said thread engaging members is in driving relation with said threaded shaft and means operable in unison with the movements of said thread engaging members to shift said index member.

7. A machine tool comprising a bed, a work spindle carried thereby, a tool holder movable along said bed, a threaded shaft mounted stationarily along said bed, a tool holder driving shaft mounted rotatably along said bed, members carried by said tool holder positioned radially about said threaded member and adapted to selectively engage said threaded shaft to feed said tool holder along said bed, a train of driving members carried by said tool holder adapted to transmit motion from said tool holder driving shaft to said thread engaging member to propel said tool holder along said bed, and a reversing member included in said train of driving members operable to feed said train of driving members selectively in forward or reverse direction, and means to indicate which of said members is in driving relation with said threaded member.

8. A machine tool comprising a bed, a work spindle carried thereby, a tool holder movable along said bed, a threaded shaft mounted stationarily along said bed, a tool holder driving shaft mounted rotatably along said bed, members carried by said tool holder adapted to selectively engage said threaded shaft to feed said tool holder along said bed, a train of driving members carried by said tool holder adapted to transmit motion from said tool holder driving shaft to said thread engaging member to propel said tool holder along said bed, and shiftable speed changing members included in said train of driving members operable to vary the speed of the tool holder feed relative to the speed of the work spindle, and means to indicate which of said members is in driving relation with said threaded member.

9. A machine tool comprising a bed, a work spindle carried thereby, a tool holder movable along said bed, a threaded shaft mounted stationarily along said bed and provided with a plurality of threads, a tool holder driving shaft mounted rotatably along said bed, a plurality of thread engaging members positioned radially about said threaded shaft and each continuously in mesh with a thread upon said threaded shaft, means operable to shift said thread engaging members selectively into driving relation with said threaded shaft, a train of driving members carried by said tool holder adapted to transmit motion from said tool holder driving shaft to said thread engaging members to propel said tool holder along said bed, and shiftable speed changing members included in said train of driving members operable to vary the speed of the tool holder feed relative to the speed of the work spindle, and means to indicate which of said members is in driving relation with said threaded member.

10. A machine tool comprising a bed provided with stop members to define the limits of a tool holder feed thereon, a work spindle carried by said bed, a tool holder movable along said bed intermediate of said stop members, a threaded shaft mounted stationarily along said bed, a tool holder driving shaft mounted rotatably along said bed, thread engaging members carried by said tool holder adapted to selectively engage the thread of said threaded shaft to feed said tool holder along said bed, a train of driving members carried by said tool holder adapted to transmit motion from said tool holder driving shaft to said thread engaging member, and a shiftable member included in said train of driving members operable by engagement with said stop members on said bed to disengage said thread engaging member from driving relation with said tool holder driving shaft automatically at opposite limits of the prescribed feed of said tool holder, and means to indicate which of said members is in driving relation with said threaded member.

11. A machine tool comprising a bed, a work spindle carried thereby, a tool holder movable along said bed, a threaded shaft mounted stationarily along said bed, and provided with a tool holder feeding thread and a thread chasing thread, a plurality of thread engaging members each continuously in mesh with a thread upon said threaded shaft and each shiftable into and out of driving relation with said threaded shaft, a tool holder driving shaft rotatably mounted along said bed and driven from said work spindle, a train of driving members carried by said tool holder operable to transmit motion from said tool holder driving shaft to said thread engaging members, means operable to shift said thread engaging members selectively into driving relation with the tool holder feeding thread or the screw chasing thread of said threaded shaft, a tool holder feeding index table, an independent thread chasing index table, means operable in unison with the movements of said thread engaging members to alternately display said tool holder feeding index table and said screw thread chasing index table, and a shiftable member included in said train of driving members operable to engage and disengage said tool holder driving shaft in driving relation with said threaded members.

12. A machine tool comprising a bed, a work spindle carried thereby, a tool holder movable along said bed, a threaded shaft mounted stationarily along said bed and provided with a tool holder feeding thread and a screw chasing thread, a plurality of thread engaging members each continuously in mesh with a thread upon said threaded shaft and each shiftable into and out of driving relation with said threaded shaft, a tool holder driving shaft rotatably mounted along said bed and driven from said work spindle, a train of driving members carried by said tool holder operable to transmit motion from said tool holder driving shaft to said thread engaging members, a member shiftable to selectively engage respective thread engaging members in driving relation with the tool holder feeding thread or the screw thread chasing thread of said threaded shaft, shiftable speed changing members carried by said tool holder operable to change the speed of said threaded engaging member relative to said tool holder driving shaft, and a shiftable member operable to engage and disengage said thread engaging members in driving relation with said tool holder driving shaft.

13. A machine tool comprising a bed, a work spindle carried thereby, a tool holder movable along said bed, a threaded shaft mounted stationarily along said bed and provided with a plurality of threads, a plurality of thread engaging members each continuously in mesh with a thread upon said threaded shaft, means to drive said thread engaging members to feed said tool holder along said bed, shiftable means operable manually to shift said thread engaging members selectively into driving relation with said threaded shaft, a plurality of index tables operatively connected with said shiftable means and shiftable therewith to display one index table at a time to correspond with the thread engaging member in driving relation with said threaded shaft, and shiftable means operable to start and stop the feed of said thread engaging members.

14. A machine tool comprising a bed, a work spindle rotatably mounted thereon, a tool holder movable along said bed, a threaded shaft mounted stationarily along said bed, and provided with a tool holder feeding thread and a screw chasing thread, a plurality of thread engaging members each continuously in mesh with a thread upon said threaded shaft and each shiftable into and out of driving relation with said threaded shaft, a tool holder driving shaft rotatably mounted along said bed and driven from said work spindle, a train of driving members carried by said tool holder operable to transmit motion from said tool holder driving shaft to said thread engaging members, a member shiftable to selectively engage respective thread engaging members in driving relation with the tool holder feeding thread or with the screw thread chasing thread of said threaded shaft, shiftable speed changing members carried by said tool holder operable to change the speed of said thread engaging members relative to said tool holder driving shaft, a shiftable member movable with said tool holder operable to engage and disengage said thread engaging members in driving relation with said tool holder driving shaft, and a shiftable member movable with said tool holder operable to stop and start said work spindle.

15. A machine tool comprising a bed, a work spindle rotatably mounted thereon, shiftable speed changing members operable to vary the speed of said work spindle, a tool holder movable along said bed, a threaded shaft mounted stationarily along said bed, and provided with a tool holder feeding thread and a screw chasing thread, a plurality of thread engaging members each continuously in mesh with a thread upon said threaded shaft and each shiftable into and out of driving relation with said threaded shaft, a tool holder driving shaft rotatably mounted along said bed and driven from said work spindle, a train of driving members carried by said tool holder operable to transmit motion from said tool holder driving shaft to said thread engaging members, a member shiftable to selectively engage respective thread engaging members in driving relation with the tool holder feeding thread or with the screw chasing thread of said threaded shaft, shiftable speed changing members carried by said tool holder operable to change the speed of said thread engaging members relative to said tool holder driving shaft, a shiftable member movable with said tool holder operable to engage and disengage said thread engaging members in driving relation with said tool holder driving shaft, a shiftable member movable with said tool holder operable to stop and start said work spindle, and a shiftable member movable with said tool holder operable to change the speed of said work spindle and said tool holder driving shaft.

16. A machine tool comprising a bed, a work spindle carried thereby, a tool holder movable along said bed, a threaded shaft mounted stationarily along said bed provided with a pair of threads, a plurality of thread engaging members, means operable to shift said thread engaging members selectively into driving relation with said threaded shaft, an adjustable index member adapted to indicate which of said thread engaging members is in driving relation with said threaded shaft, operable in unison with the movements of said thread engaging members to shift said index member and means for predetermined the limit of movement of said tool holder.

In testimony whereof I have affixed my signature.

WILLIAM L. SCHELLENBACH.